United States Patent
O'Keeffe et al.

(10) Patent No.: US 7,480,299 B2
(45) Date of Patent: Jan. 20, 2009

(54) RULES ENGINE FOR ACCESS CONTROL LISTS IN NETWORK UNITS

(75) Inventors: Daniel Martin O'Keeffe, Dublin (IE); Eugene O'Neill, Dublin (IE); Edele O'Malley, Dublin (IE); Kam Choi, Tring (GB)

(73) Assignee: 3Com Corporation, Marlborough, MA (US)

( * ) Notice: Subject to any disclaimer, the term of this patent is extended or adjusted under 35 U.S.C. 154(b) by 496 days.

(21) Appl. No.: 11/064,227

(22) Filed: Feb. 22, 2005

(65) Prior Publication Data

US 2006/0092947 A1 May 4, 2006

(30) Foreign Application Priority Data

Nov. 3, 2004 (GB) .................................. 0424299.6

(51) Int. Cl.
*H04L 12/28* (2006.01)
*G06F 7/04* (2006.01)

(52) U.S. Cl. ............................................ 370/392; 726/3

(58) Field of Classification Search ................... None
See application file for complete search history.

(56) References Cited

U.S. PATENT DOCUMENTS

| | | | |
|---|---|---|---|
| 6,377,577 B1 * | 4/2002 | Bechtolsheim et al. ...... 370/392 |
| 6,651,096 B1 * | 11/2003 | Gai et al. ..................... 709/223 |
| 6,658,002 B1 * | 12/2003 | Ross et al. ................... 370/392 |
| 6,763,394 B2 * | 7/2004 | Tuck et al. ................... 709/238 |
| 6,778,530 B1 * | 8/2004 | Greene ........................ 370/389 |
| 7,024,515 B1 * | 4/2006 | Ruan et al. ................... 711/108 |
| 7,227,842 B1 * | 6/2007 | Ji et al. ........................ 370/235 |
| 2004/0258043 A1 * | 12/2004 | Engbersen et al. .......... 370/351 |
| 2006/0221967 A1 * | 10/2006 | Narayan et al. ............. 370/392 |

\* cited by examiner

*Primary Examiner*—Edan Orgad
*Assistant Examiner*—Timothy J Weidner

(57) ABSTRACT

A rules engine for the examination of selected fields in an addressed data packet has an access control list table of which the entries each define an access control list rule, an action and a chain identifier. The access control list rule may be a basic rule which refers to network addresses and transport layer port numbers. The rules engine also has an extension rule table of which the entries each define an extension rule, a respective action and a respective rule identifier. The extension rule may refer to a particular TCP flag. When a packet arrives, the engine searches both tables. This search is made independently of the ordinary network layer or link layer address lookup. If there is a match in both tables, and the chain identifier matches the extension rule identifier, the rules engine prescribes the action associated with the extension rule. If the chain identifier of a matched access control list rule does not match a rule identifier of a matched extension rule the rules engine prescribes the action associated with the basic rule. In the absence of a match with any access control list rule the action on a packet is based on the result from the ordinary address lookup.

15 Claims, 2 Drawing Sheets

RULES ENGINE FOR ACCESS CONTROL LISTS IN NETWORK UNITS

FIELD OF THE INVENTION

This invention relates to packet-based communication networks, particularly those which incorporate a transmission protocol such as TCP (Transmission Control Protocol). The invention particularly relates to the use of access control lists in and by network units such as switches and routers and to a rules engine employing such lists.

BACKGROUND TO THE INVENTION

Packet Forwarding

Packet-based communication systems such as those based on Ethernet standards and others include network units, which can be both hardware and software based, but usually are a mixture of hardware and software processing, and which, among other actions, perform a lookup on fields including address fields within a packet to obtain 'forwarding data' to determine so far as that unit is concerned at least one destination for the packet. Usually the forwarding data is in the form of a bit mask which indicates the port or ports from which the packet or a copy thereof should be sent. The lookup may be based on either 'layer 2' (media access control) addresses or 'layer 3' (network or IP addresses) or both.

Post-Processing

Before a packet is forwarded from a switch it may be necessary to perform other processing operations which may affect the forwarding of the packet and/or copies thereof. For example, the destination port bitmask may need modification in view of VLAN membership rules, spanning tree rules, or trunking rules. The rules are administered by respective 'engines' and a final 'post-processing engine' coupled to the various processing engines and the lookup engine produces a final port bit mask.

Transmission Control

In addition to the use of addressing of data packets, network systems usually employ a transmission protocol which is intended, with the aid of a handshake routine and subsequent codified commands and acknowledgements, reliable data transfer, because an address protocol such as IP does not in itself guarantee the deliver of any particular packet. As is indicated above, one such protocol is TCP, which is implemented as far as a network unit is concerned by means of segments encapsulated within packets. A TCP segment normally includes 'source port' and destination port' numbers which provide connection to processes within a sending host and a receiving host, a sequence number, which is the byte stream number of the first byte in the data sent in the segment, an acknowledgement number, which indicates the sequence number of the next byte that the respective host is expecting from the other host, various other fields including one bit ACK, SYN and FIN flags, a header length field and user data.

Memory Space

Network units are usually realized by means of an application-specific integrated circuit (ASIC) which has appropriate terminals or pins for coupling to ports and other external connecting elements. Memory space on an ASIC is necessarily limited and it is usual for the ASIC to supplement a comparatively small internal memory by a substantially larger external, off-chip' memory, either a static random access memory (SRAM) or a content addressable memory (CAM).

Access Control Lists

Access control lists (ACLs) refer at least in part to protocol data at a higher level than the network layer and represent an additional processing feature which may be used for checking the security of transmission of data and other purposes. If ACL lists are used, then an ACL search has to be performed on each packet to determine whether there is an ACL match. If there is a match then the forwarding action which is determined by the ACL match must be performed instead of the forwarding action determined by the address lookup (as modified as the case may be by the actions of the other processing engines).

An access control list (ACL) may simply consist of a basic ACL, which when relating to TCP normally consists of five fields identifying the IP destination address (IPDA), the IP source address (IPSA), the TCP destination port number, the TCP source port number and the Protocol. However, other ACLs may comprise the basic 5-tuple ACL along with other flags, such as the SYN, FIN, RST flags or other flags or fields. It is preferable to provide at least one ACL per TCP flow direction and desirable to provide a multiplicity of ACLs per flow direction. Each ACL requires an entry in a database, and a basic ACL is quite long; source port and destination port numbers are (currently) two bytes each, network addresses are four bytes each for IPv4 and 16 bytes each for IPv6. Thus it will be apparent that, since memory space is inevitably limited, the more ACLs are required or desirable per flow, the fewer flows with ACLs can be supported.

SUMMARY OF THE INVENTION

The present invention has a general object of making the use of access control lists more versatile and efficient and a particular object of reducing the memory space required for access control lists.

In a preferred embodiment of the invention, a 'basic' rule may stored in an respective database, i.e. an 'off-chip' database and search is made for any other fields using a smaller 'internal' (on-chip) database. Rules, conveniently termed 'extension rules', may be stored in a different, preferably internal, database and are each uniquely identified by an identifier called herein 'ruleID'. An ACL entry contains an identifier, preferably a pointer, called herein an 'extACLID', which is a pointer to at least one of the extension rules. When a packet comes into the system, both the databases are searched. The search may provide an ACL match in the ACL database, and a rule match in the extension rule database. If the extACLID of the matched ACL corresponds to the ruleID of the matched extension rule, then a chained rule is formed. This allows an ACL to chain with an extension rule, creating an 'Extended ACL'. If the same ruleID is used for multiple 'extension' rules, and there is a match with that ruleID, the respective ACL is now pointing to multiple 'extension' rules and thereby creates a multiplicity of 'Extended ACLs'.

Since the search for extension rules is generally a search for small fields (such as TCP flags) in a packet, the entries identifying the extension rules consume much less memory than a 5-tuple ACL. Therefore, chaining one ACL to multiple extension rules to form multiple ACLs per TCP flow is much less memory intensive as storing multiple ACLs per TCP flow.

Other features of the invention will become apparent from the following description with reference to the accompanying drawings.

DETAILED DESCRIPTION

Figure 1:
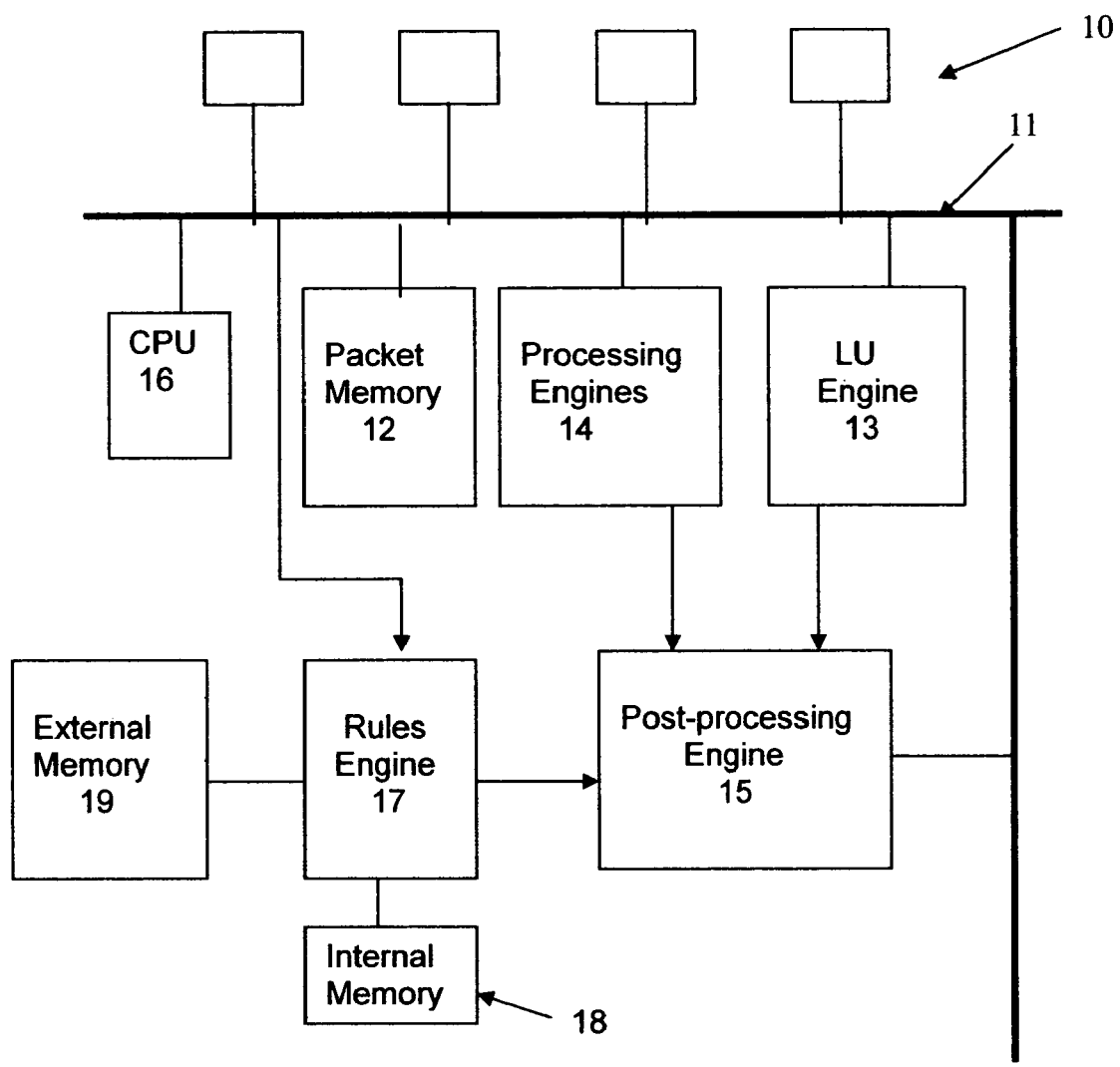
FIG. 1 is a simplified representation of a multi-chip network switch.

FIG. 1 of the drawings shows schematically a network unit in which the present invention may be embodied. Only the principal parts of the unit will be described because the invention is not dependent on any particular architecture.

The unit has a multiplicity of external ports 10 by which the unit can receive addressed data packets and from which addressed data packets can be forwarded. It includes an internal communication system, herein simply represented by a bus 11, by which packets, control signals and commands are conveyed across the unit. The unit includes a main memory 12 which receives packets while they are processed before being forwarded, or in some cases, discarded. When a packet is received, address fields in its header are examined by a lookup engine 13 which determines, with the aid of a lookup or forwarding database (not shown) forwarding data for the packet. As is well known to those skilled in the art, forwarding data for the destination specified in the packet may not exist and therefore the unit may need to perform an address resolution protocol to obtain one. This and other customary features of a unit such as a switch or router will not be described.

The unit usually includes other processing engines 14 which, as indicated earlier may modify or supplement the forwarding data obtained by the lookup (LU) engine. The actions prescribed by the engines 13 and 14 are collated by a post-processing engine 15 which will (in the absence of any other consideration) produce a final forwarding action based on the forwarding data and in particular produce a 'final' bit mask so that the packet can be sent from the port or ports determined by the forwarding action.

The unit includes a central processor 16 which has a variety of tasks not directly relevant to the invention; among other tasks it controls the establishment of a TCP flow within the unit in a manner to be described.

The unit's memory may be partly constituted by on-chip memory and partly by off-chip memory. This not only allows for expansion but is a consequence of network working. A switch may have thousands of addresses to store but only a few may be active at any one time. Since space is always limited and valuable, it is usual for the on-chip memory to be comparatively small and the off-chip memory to be much larger.

As thus far described the unit operates on known principles.

Although the reference data (such as source port and destination port numbers) in a TCP segment are not necessary for the operation of a switch as such, since the switch operates primarily in accordance with network or link layer address data, it is nevertheless useful to provide, as a security feature or otherwise, processing which has recourse to access control lists that refer at least in part to transmission protocol fields in a packet.

Access Control Lists (ACLs) have to be set up in accordance with a TCP flow, and there needs to be an entry in an ACL table (i.e. memory) for each of the two directions of a TCP flow.

When a TCP flow is initiated from one host to another, then as previously mentioned, a packet is sent with a TCP segment of which the TCP SYN flag is set (to 1). The unit which is on the path between the hosts will have the ACL list facility enabled, and a packet which has the TCP SYN flag set will be diverted to the CPU so that that it can examine the packet in more detail. On determining that the packet is secure, the packet is forwarded onto the destination host, and the details of the flow are put into the ACL table. If the destination host is willing to accept communication from the original source host, then a packet is sent back with the TCP ACK flag set. Again the unit intercepts the packet, checks its integrity, and if the packet secure, updates the ACL table for the flow in the direction of the destination host to source host. The packet is allowed to continue on its path. Some more control packets may be required to establish the TCP flow fully, and the CPU may intercept these to guarantee their integrity. Finally, the flow is fully established and the ACL table has an ACL entry for both directions of the flow.

It is convenient to define a 'basic' ACL for a particular flow direction. For a TCP flow, such a basic ACL is preferably a five field (often termed 5-tuple) ACL comprising the IP destination address (IPDA), the IP source address (IPSA), the TCP destination port number, the TCP source port number and the Protocol. Other ACLs may consist of the basic 5-tuple ACL, along with other fields such as one or more TCP flags (such as SYN, FIN or RST). It is conceivable to have at least three ACLs per flow. As each ACL consumes an entry in the ACL database, the more ACLs per flow, the fewer the number of flows the system can support.

Therefore, not only is it quite inefficient to store each of these ACLs, the system is inflexible. More particularly, a lookup engine which searches the external database is typically looking at certain fields in a packet and it is usual to customize the engine accordingly. Therefore, if the external lookup engine is designed to search for the basic ACL and also the TCP flags, it may not be possible to search for a new field if there arise a new requirement for that field.

The present invention is based on the storage of the basic ACL in a respective database, which may be the 'external' memory and the storage of extension 'rules' in a separate table, which may be held within a smaller internal memory. These rules will prescribe particular values for a selected field. The results of the two searches are chained together.

In FIG. 1 a rules engine 17, to be described has recourse to two tables, one in an internal memory 18 and one in an external memory 19. The memory 19 would be external to the application specific integrated circuit which embodies the various engines previously described. The main packet memory 12 may be partly constituted by on-chip memory and partly by the off-chip memory 19.

Figure 2:
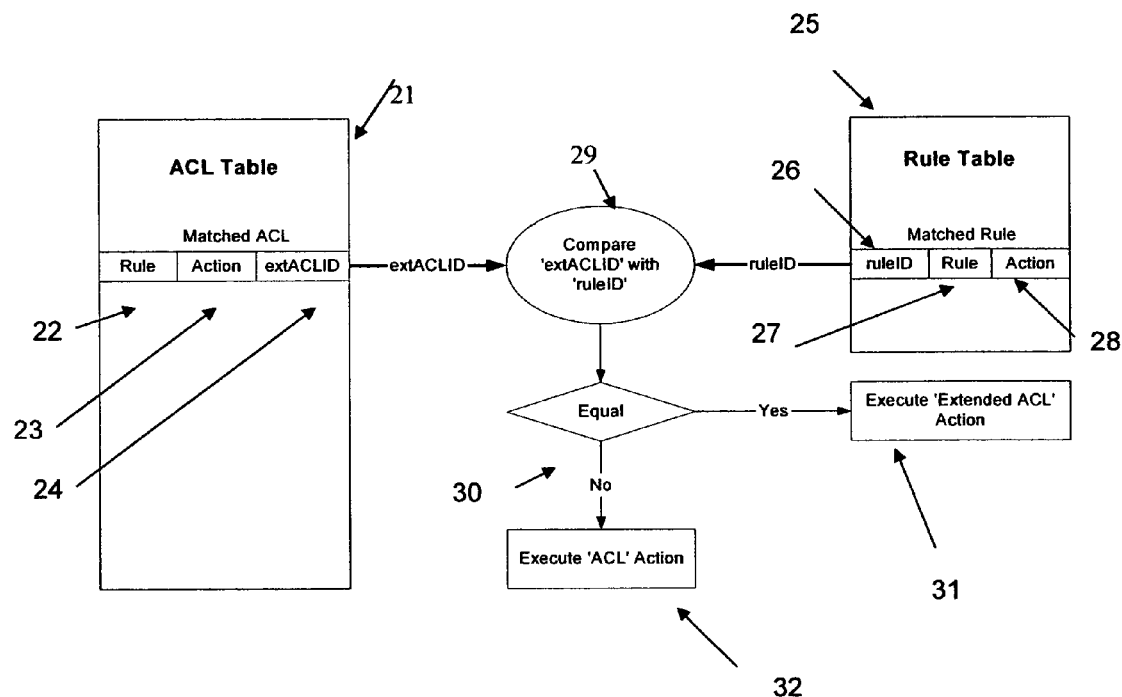
FIG. 2 illustrates a rules engine according to the invention.

The operation of the rules engine 17 is shown in FIG. 2. In an ACL table 21 (held in memory 19) are entries comprising a 'basic' rule 22, an action 23 and an 'extACLID 24. A rule table 25 (held in memory 18) contains entries each comprising a ruleID 26, an extension rule 27 and an action 28. Each rule (as in rule engines generally) is a set of values that a specific field or selection of fields or portions thereof extracted from the packet must possess for the rule to be matched. Usually exact match is required (as for a one bit field such as a TCP SYN bit). However, in general, where the rule relates to a longer field, rule matching may allow for a partial match by means of 'don't care' bits. The action is the action that will be required in relation to the packet if the respective rule is matched by the packet being examined. For example, the action could be to cause copying of the packet for use by a monitoring or management agent; the action could specify the addition of a set bit to the forwarding bit mask by the setting of a bit related to a monitoring or management port.

The 'ruleID' 26 is a number or pointer which uniquely identifies the respective rule. The basic rule 22 in the ACL table entry will, for example, specify a particular value for a respective basic 5-tuple ACL. It will have been entered as noted above when a respective 'flow' has been established. The extACLID 24 is a pointer to at least one of the internal rules in the rule table 25. It may identify a single extension rule 27 uniquely but may point to a range of extension rules in table 25.

When a packet comes into the unit, both tables are searched. Suppose first that the relevant fields in the packet produce a match in both the ACL table 21 and the extension rule table 25. The match will of course 'return' the relevant extACLID pointer and the relevant ruleID pointer respectively. These are compared, as shown by block 29 and decision 30. If the extACLID 24 of the matched ACL rule 22 equals the ruleID 26 of the matched extension rule 27, then a 'chain rule' is formed and the action to be executed (block 31) will be the action 28 specified for the matched extension rule from the rule table 25. If there is no match between the extACLID and the ruleID, the prescribed action to be executed (block 32) will be the action 23 that is specified in the ACL entry.

As mentioned, the extACLID can match with more than one ruleID, so that a single basic ACL rule can thereby form a multiplicity of chained rules. Thus different actions may be executed for a matched ACL depending on the actions specified in the rules table for the different extension rules that can be chained to the common ACL rule.

Because the search engine for the rule table 25 is normally searching for small fields (such as TCP flags), the entries in the rule table 25 consume much less memory than a 5-tuple ACL. Therefore, chaining one ACL to multiple extension rules to form multiple ACLs per TCP flow is much less memory intensive as storing a corresponding multiplicity of ACLs per TCP flow. Furthermore since an action prescribed by an extension rule in the rule table 25 will generally be the same regardless of which ACL points to it (usually an instruction to copy a packet or to redirect it to a management port), then these extension rules can be shared between multiple ACLs. This is again another saving on costly memory.

In a first example suppose that a Packet A is searched against the external ACL table 21, and matches against an entry ACL #1. The ACL match has a extACLID pointing to extension Rule #5 (which merely for the sake of example is 'TCP SYN flag set'). The packet is also searched against the extension rule table 25, but does not match against any rule therein. Then the extACLID of the matched ACL does not match any ruleID, and so the action 23 of the matched ACL is executed.

In a second example a packet B is searched against the ACL table, and matches against an ACL rule, say ACL #2. The matched entry has a extACLID pointing to extension rule #5 (TCP SYN flag set) in the extension rule table 25. The packet is also searched against the extension Rule table, and matches against extension rule #5. As the extACLID of the matched ACL is equal to the ruleID of the matched extension rule, a chained rule (Extended ACL) is formed and the action 28 of extension rule #5 must be used. This action could be to redirect the packet to a management port.

These two examples show two different packets, matching against two different ACLs, but both pointing to the same extension rule. As the required action (redirect to management port) is the same for both packets, the technique allows the internal rule to be shared between the two ACLs.

Accordingly the invention allows a more efficient use of memory as well as the combination of a scaleable search engine (for the ACL table) with the versatility of extension rules. The use of an 'internal' engine for the 'extension' rules renders the system more versatile because it is much more feasible to accommodate new rules or new fields.

The result (if any) of the searching of the ACL table and the extension rules table is an action, either a chain rule action 28 or an ACL action 23, which will be executed by the post-processing engine rather than the action prescribed by the lookup or other processing engines.

Of course, if the search of the ACL table produces no match, no instruction will be given to the post-processing engine, which will cause the forwarding of the packet using the forwarding data obtained from the lookup engine, as possibly modified by the other processing engines.

The invention has been particularly described with reference to TCP but is applicable to other possible transmission protocols which could be used to define a flow.

The invention claimed is:

1. A rules engine for the examination of selected fields in an addressed data packet, comprising:
   an access control list table containing entries each defining an access control list rule, a respective first action and a chain identifier; and
   an extension rule table for entries each defining an extension rule, a respective second action and a respective rule identifier
   wherein the rules engine is operative:
   (a) to search said access control list table to ascertain a match between an access control list rule and said addressed data packet;
   (b) to search said extension rule table to ascertain a match between an extension rule and said addressed data packet;
   in the event of a matched access control list rule matched to said addressed data packet, to prescribe one of:
   (ci) the respective second action associated with a matched extension rule in the event of correspondence between a chain identifier associated with the matched extension rule and a rule identifier identifying a match between that matched extension rule and said addressed data packet; or
   (cii) in the absence of said correspondence, the respective first action associated with said matched access control list rule.

2. A rules engine as in claim 1 wherein said access control list rules relate to fields in TCP (Transmission Control Protocol) segments and network address fields.

3. A rules engine as in claim 1 wherein said extension rules relate to TCP flags.

4. A rules engine as in claim 1 wherein said extension rule table is constituted by memory within an application specific integrated circuit and said access control list table is constituted by memory external to said application specific integrated circuit.

5. A rules engine as in claim 1 wherein a chain identifier matches a plurality of rule identifiers.

6. A network unit comprising:
   (1) a multiplicity of ports for receiving and forwarding addressed data packets;
   (2) a lookup engine for producing forwarding data in response to address data in an addressed data packet;
   (3) a post-processing engine for executing a forwarding action based on said forwarding data;
   (4) a rules engine comprising:
      (a) an access control list table containing entries each defining an access control list rule, a respective first action and a chain identifier; and
      (b) an extension rule table for entries each defining an extension rule, a respective second action and a respective rule identifier wherein the rules engine is operative:
- (i) to search said access control list table to ascertain a match between an access control list rule and said addressed data packet;
- (ii) to search said extension rule table to ascertain a match between an extension rule and said addressed data packet; and
- in the event of a matched access control list rule matched to said addressed data packet, to prescribe one of:
- (iiia) the respective second action associated with a matched extension rule in the event of correspondence between a chain identifier associated with the matched extension rule and a rule identifier identifying a match between that matched extension rule and said addressed data packet; or
- (iiib) in the absence of said correspondence, the respective first action associated with said matched access control list rule; and
- wherein said post-processing engine is operative to execute said respective first or second action as prescribed by said rules engine.

7. A network unit as in claim 6 wherein said post-processing engine executes said forwarding action in the absence of any action prescribed by said rules engine.

8. A network unit as in claim 6 wherein said access control list rules relate to fields in TCP segments and network address fields.

9. A network unit as in claim 6 wherein said extension rules relate to TCP flags.

10. A network unit as in claim 6 wherein a chain identifier matches a plurality of rule identifiers.

11. A network unit as in claim 6 wherein said extension rule table is constituted by memory within an application specific integrated circuit which includes said lookup engine and said post-processing engine and said access control list table is constituted by memory external to said application specific integrated circuit.

12. A method of operating a rules engine for the examination of selected fields in an addressed data packet, comprising:
- (a) establishing an access control list table containing entries each defining an access control list rule, a respective first action and a chain identifier;
- (b) establishing an extension rule table for entries each defining an extension rule, a respective second action and a respective rule identifier
- (c) searching said access control list table to ascertain a match between an access control list rule and said addressed data packet;
- (d) searching said extension rule table to ascertain a match between an extension rule and said addressed data packet; and
- (e) in the event of a matched access control list rule matched to said addressed data packet prescribing one of:
- (e1) the respective second action associated with a matched extension rule in the event of correspondence between a chain identifier associated with the matched extension rule and a rule identifier identifying a match between that matched extension rule and said addressed data packet; or
- (e2) in the absence of said correspondence, the respective first action associated with said matched access control list rule.

13. A method as in claim 12 and relating said access control list rules relate to fields in TCP (Transmission Control Protocol) segments and network address fields.

14. A method as in claim 12 and relating said extension rules to TCP flags.

15. A method as in claim 12 and matching a chain identifier to a plurality of rule identifiers.

* * * * *